United States Patent
Sauro et al.

(10) Patent No.: US 12,466,988 B2
(45) Date of Patent: Nov. 11, 2025

(54) METHOD FOR REMOVING A FILTER CAKE FROM A BOREHOLE

(71) Applicant: Arkon Solutions Corp., Calgary (CA)

(72) Inventors: Vittorio Antonio Sauro, Calgary (CA); Alan Jones, Calgary (CA); Vanessa Gonzalez, Calgary (CA); Ahmed Shahin, Calgary (CA)

( * ) Notice: Subject to any disclaimer, the term of this patent is extended or adjusted under 35 U.S.C. 154(b) by 0 days.

(21) Appl. No.: 18/659,835

(22) Filed: May 9, 2024

(65) Prior Publication Data

US 2024/0376370 A1 Nov. 14, 2024

Related U.S. Application Data

(60) Provisional application No. 63/465,174, filed on May 9, 2023.

(51) Int. Cl.
| | |
|---|---|
| *E21B 37/00* | (2006.01) |
| *C09K 8/10* | (2006.01) |
| *C09K 8/52* | (2006.01) |
| *C09K 8/528* | (2006.01) |

(52) U.S. Cl.
CPC .............. *C09K 8/52* (2013.01); *C09K 8/10* (2013.01); *C09K 8/528* (2013.01); *E21B 37/00* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 4,689,161 A * | 8/1987 | Blumenthal | B82Y 30/00 |
| | | | 507/143 |
| 5,238,065 A | 8/1993 | Mondshine et al. | |
| 9,493,697 B2 | 11/2016 | Luyster et al. | |
| 11,319,477 B2 | 5/2022 | Santos et al. | |
| 11,414,589 B2 | 8/2022 | Elkatatny et al. | |
| 2008/0070806 A1* | 3/2008 | Lin | C09K 8/584 |
| | | | 507/140 |
| 2011/0005773 A1* | 1/2011 | Dusterhoft | C09K 8/52 |
| | | | 166/376 |
| 2017/0335172 A1* | 11/2017 | Schnoor | C09K 8/68 |

OTHER PUBLICATIONS

Mahapatra, Shrikant K., and Koszlin, Bela, "Magnesium peroxide breaker for filter cake removal", Journal of Petroleum Technology, 63(9): 69-72.

* cited by examiner

*Primary Examiner* — Andrew Sue-Ako
(74) *Attorney, Agent, or Firm* — McMillan LLP

(57) ABSTRACT

The present disclosure relates to a method for removing a filter cake from a well in a subterranean formation without the need for mechanical isolation. The method comprises the steps of introducing a first alkaline aqueous fluid comprising an oxidizing agent into a borehole, introducing an activating agent selected from the group consisting of an aldehyde, a dialdehyde, a polyoxymethylene, and any suitable combination thereof into the borehole, the activating agent for activating the oxidizing agent, controlling a time frame during which the activating agent activates the oxidizing agent, activating the oxidizing agent with the activating agent, decomposing at least a portion of a filter cake by activating the oxidizing agent with the activating agent, and removing at least a portion of the filter cake from the borehole.

40 Claims, 3 Drawing Sheets

METHOD FOR REMOVING A FILTER CAKE FROM A BOREHOLE

TECHNICAL FIELD

The present disclosure relates a method for removing a filter cake or a part thereof from a borehole in a subterranean formation.

BACKGROUND

In a subterranean drilling operation, a filter cake can develop on the surface of a wellbore (e.g., mother wellbore or laterals) from the accumulation of materials present in the drilling fluid. While a filter cake plays an important role in stabilizing the wellbore during the completion of the subterranean drilling operation, an excess volume of filter cake (e.g. a filter cake of excess thickness) can lead to flow resistance of fluids flowing through the wellbore. Such flow resistance increases the effort required to extract a resource (e.g., a hydrocarbon) through the wellbore, which in turn increases the cost of the overall drilling operation. For example, it has been noted that the presence of polysaccharide polymers in the filter cake substantially increases the time required to remove the filter cake due to the encapsulation of bridging agents within the filter cake by the polysaccharide polymer. Non-limiting examples of polysaccharide polymers include water-soluble salts of alginic acid, carrageenan, gum agar, gum Arabic, gum ghatti, cellulose derivatives such as hydroxyethyl cellulose, hydroxypropyl cellulose, carboxymethyl cellulose, hydroxyethyl carboxymethyl cellulose, alkyl cellulose ethers, starch ether derivatives such as carboxymethyl starch, hydroxyethyl starch, hydroxyl propyl starch, and crosslinked starch ethers, guar gum, and its derivatives, such as hydroxypropyl guar, hydroxyethyl guar, carboxymethyl guar, biopolymers such as xanthan gum, gellan gum, and welan gum. As such, the filter cake or portions thereof eventually ought to be removed from the wellbore (including the mother wellbore and laterals) to maximize extraction of the resource (e.g. hydrocarbons) from a subterranean reservoir and through the well.

The timing of removing a filter cake or portions thereof from a mother wellbore and laterals extending therefrom is important. For example, removing the filter cake from the surface of a lateral wellbore before drilling the mother wellbore or other laterals has been completed would put the entire well on "suction" (as such term is understood in the subterranean hydrocarbon extraction industry). Therefore, it is desirable to control the rate, timing or both the rate and timing at which the filter cake breaks down to ensure that the drilling of the mother wellbore and other laterals can be completed without complications from previously drilled sections.

Presently, oxidative breakers used to break down filter cakes result in filter cake break times on the order of up to several hours. This relatively short time lag is insufficient for drilling a plurality of laterals of a well before the well goes on "suction". For example, U.S. Pat. No. 5,238,065 describes the removal of a filter cake by placing the filter cake in contact with a brine fluid containing a zinc or alkaline earth metal peroxide, an acidic substance such that the pH of the brine fluid is between about 1 and about 8, and a water-soluble activating agent for activating the peroxide. The water-soluble activating agent comprises (1) a source of a cation selected from a group consisting of cuprous, ferrous, nickelous, manganous, and mixtures thereof, and (2) organic hydroxyl compounds. However, it is known that the innovation described in U.S. Pat. No. 5,238,065 is capable of rupturing the integrity of a filter cake in a relatively short period of time (e.g. an hour). As noted above, this relatively short time lag is insufficient for drilling a plurality of laterals of a well before the well goes on "suction".

While mechanical methods are used to isolate already drilled lateral well sections from the in-progress sections, such mechanical methods are costly from the perspective of finances and time and at times bring on their own complications.

SUMMARY

The present disclosure relates a method for removing a filter cake from a borehole in a subterranean formation. The method disclosed herein can extend the time lag for breaking, dissolving, loosening, or other disrupting the integrity of a filter cake to about 4 or 5 days, which would permit a subterranean drilling operator to drill additional lateral well sections without the need for mechanical isolation.

According to a part of the disclosure, there is a method for removing a filter cake from a borehole in a subterranean formation without the need for mechanical isolation, the method comprising: (a) introducing a first alkaline aqueous fluid comprising an oxidizing agent into the borehole during a drilling operation; (b) forming the filter cake; (c) introducing an activating agent selected from the group consisting of an aldehyde, a dialdehyde, a polyoxymethylene, and any suitable combination thereof into the borehole, the activating agent for activating the oxidizing agent; (d) controlling a time frame during which the activating agent activates the oxidizing agent; (e) activating the oxidizing agent with the activating agent; (f) decomposing at least a portion of the filter cake by activating the oxidizing agent with the activating agent, thereby forming a residual filter cake; and (g) removing at least a portion of the residual filter cake from the borehole.

The subterranean formation generally does not have a temperature range that exceeds 120° C. The subterranean formation generally does not have a pressure that is less than atmospheric pressure.

The oxidizing agent may be selected from the group consisting of a peroxide, a percarbonate or derivative thereof, a perborate or derivative thereof, a persilicate or derivative thereof, a percarbamide or derivative thereof, a persulfate or derivative thereof, a perphosphonate or derivative thereof, and any suitable combination thereof. The peroxide may be selected from the group consisting of hydrogen peroxide, calcium peroxide, magnesium peroxide, alkali metal peroxides, dialkyl peroxides, and any suitable combination thereof. The oxidizing agent may be present in the first alkaline aqueous fluid at a concentration of between about 0.1 kg/m$^3$ and about 5 kg/m$^3$. The oxidizing agent may be surrounded by a coating at least at the time that the first alkaline aqueous fluid is introduced into the borehole; the coating may be a water-soluble coating, a water-permeable coating, or a porous coating.

The activating agent may be a polyoxymethylene. The polyoxymethylene may be selected from the group consisting of a paraformaldehyde or derivative thereof, a dioxane or derivative thereof, a trioxane or derivative thereof (for example, a 1,3,5 trioxane), and any suitable combination thereof. The activating agent may be surrounded by a coating at least at the time that the activating agent is introduced into the borehole; the coating may be a water-soluble coating, a water-permeable coating, or a porous coating. The activating agent may be a part of a second aqueous fluid. The activating agent may be introduced into the borehole by introducing the second aqueous fluid into the borehole, and the activating agent may be present in such second aqueous fluid at a concentration of between about 0.1 kg/m$^3$ and about 20 kg/m$^3$.

The filter cake may be formed in a manner such that the filter cake comprises the oxidizing agent. The first alkaline aqueous fluid may also comprise a polymer capable of being oxidized by the oxidizing agent.

The second aqueous fluid may be introduced into the borehole after the filter cake is formed, and the method may further comprise placing the second aqueous fluid in fluid communication with the filter cake.

The first alkaline aqueous fluid may further comprise the activating agent, and the activating agent may be present in the first alkaline aqueous fluid at a concentration of between about 0.1 kg/m$^3$ and about 20 kg/m$^3$. The first alkaline aqueous fluid may be selected from the group consisting of a drilling fluid, a stimulation fluid, a fracturing fluid, a spotting fluid, a packer fluid, and any combination thereof.

The filter cake may be formed in a manner such that the filter cake comprises the oxidizing agent and the activating agent.

According to a part of the disclosure, there is a method for removing a filter cake from a borehole in a subterranean formation without mechanical isolation, the method comprising: (a) preparing a first preparatory fluid comprising an activating agent selected from the group consisting of an aldehyde, a dialdehyde, a polyoxymethylene, and any suitable combination thereof; (b) preparing a second preparatory fluid comprising an oxidizing agent; (c) mixing the first preparatory fluid and the second preparatory fluid to form the first alkaline aqueous fluid; (d) introducing the first alkaline aqueous fluid into the borehole during a drilling operation; (e) introducing an acid-generating compound into the borehole; (f) forming the filter cake; (g) controlling a time frame during which the activating agent activates the oxidizing agent; (h) activating the oxidizing agent with the activating agent; (i) decomposing at least a portion of the filter cake, thereby forming a residual filter cake; and (j) removing at least a portion of the residual filter cake from the borehole. The first alkaline aqueous fluid may be placed in fluid communication with the filter cake. The first alkaline aqueous fluid may have a pH that is between about 9 and about 10.

The acid-generating compound may be introduced into the borehole before or after the first alkaline aqueous fluid is introduced into the borehole. The acid-generating compound may be present in the first alkaline aqueous fluid at a concentration of between about 0.1 wt. % and about 10 wt. % of the activating agent. The acid-generating compound may be adapted to react with the activating agent to form at least one of an acid and a tertiary amine salt. The acid-generating compound may be adapted to react with the activating agent to form a tertiary amine salt at a concentration of between about 0.01 wt. % and about 5 wt. % of the first alkaline aqueous fluid. The acid-generating compound may be selected from the group consisting of an ammonium salt, a di-ammonium salt, and a combination thereof. The ammonium salt may be selected from the group consisting of ammonium chloride, ammonium nitrate, ammonium sulfate, ammonium hydroxide, ammonium bromide, an ammonium salt of an organic acid, and any suitable combination thereof. The ammonium salt of an organic acid may be selected from the group consisting of ammonium acetate and ammonium formate. The di-ammonium salt may be di-ammonium phosphate.

The activating agent may be formaldehyde, and the acid-generating compound may be ammonium chloride. The activating agent may be polyoxymethylene, and the acid-generating compound is an ammonium salt. The oxidizing agent may be a source of free radicals.

This summary does not necessarily describe the entire scope of all aspects of the disclosure. Other aspects, features and advantages will be apparent to those of ordinary skill in the art upon review of the following description of specific embodiments.

DETAILED DESCRIPTION

Figure 1:
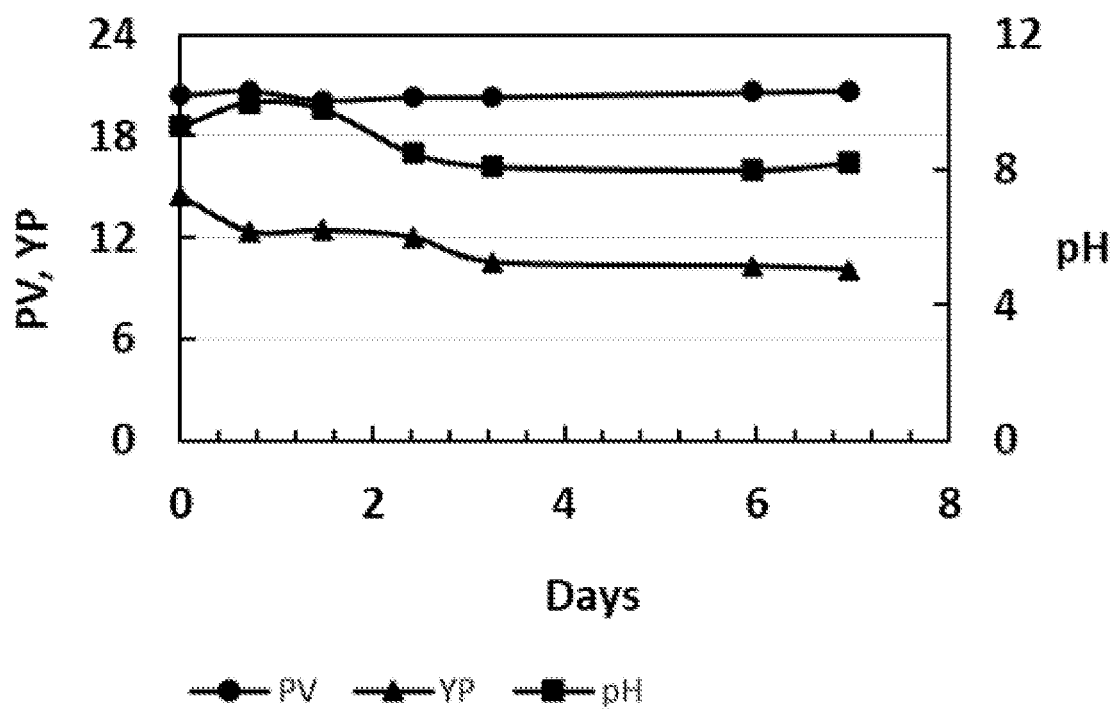
FIG. 1 is a graph that illustrates the change in the plastic viscosity (PV, as measured in mPa·s), yield point (YP, as measured in Pa) and pH according to an embodiment of a water-based drilling fluid described in Example 1 herein.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Any element expressed in the singular form also encompasses its plural form. Any element expressed in the plural form also encompasses its singular form. The use of the word "a" or "an" when used herein in conjunction with the term "comprising" may mean "one", but it is also consistent with the meaning of "one or more", "at least one", and "one or more than one".

As used herein, the term "about" when followed by a recited value means plus or minus 10% of the recited value.

As used herein, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

As used herein, the term "delayed breaker method" means a method for removing a filter cake or portion thereof from a borehole in a subterranean formation.

As used herein, the term "predominant" means "the largest component of".

As used herein, the term "zonal coverage" means control within a drilled lateral section (also known as a "desired zone" in the art) that would allow for use of a delayed breaker method while drilling additional sections.

The present disclosure relates to a method for removing a filter cake or portion thereof from a borehole in a subterranean formation (also referred to herein as a "delayed breaker method"). The present disclosure also relates to compositions and methods for removing filter cakes from conventional and unconventional subterranean formations comprising hydrocarbon-bearing reservoirs of varying permeability.

This method involves circulating one or more fluids comprising an oxidizing agent and an activating agent into a wellbore, placing a filter cake and any residual mud present downhole in contact with the one or more fluids, and then shutting in the well for a predetermined amount of time. After the fragmentation of the filter cake, the wellbore may be flushed with a fluid to remove the filter cake fragments. The method disclosed herein can extend the time lag for breaking, dissolving, loosening, or other disrupting the integrity of a filter cake to about 4 or 5 days, which would permit a subterranean drilling operator to drill additional lateral well sections without the need for mechanical isolation.

The one or more fluids comprising an oxidizing agent and an activating agent may be formulated as displacement fluids for use in drilling, completions, and workover operations in subterranean formations. Displacement fluids comprising an oxidizing agent and an activating agent may address some problems associated with efficient well cleanup and completion, including completions conducted in open-hole horizontal and high-angle wells. The method disclosed herein can be used to remove filter cakes and reduce blockages, plugging, and damage to natural flow channels within the well. Hence, the method disclosed herein can be used to "clean" a wellbore drilled with water-based mud containing polysaccharide polymers.

The subterranean conditions may vary depending on drilling operations. Generally, however, it is contemplated that the subterranean formation has a temperature range that does not exceed 120° C. Generally, it is contemplated that the subterranean formation has a pressure that is equal to or greater than about 10 psi. For example downhole conditions may comprise a pressure of between about 10 psi and about 100,000 psi. For example, downhole conditions may comprise a pressure of equal to or greater than atmospheric pressure.

The method generally comprises the steps of: (a) introducing a first alkaline aqueous fluid comprising an oxidizing agent into the borehole during a drilling operation; (b) forming the filter cake; (c) introducing an activating agent selected from the group consisting of an aldehyde, a dialdehyde, a polyoxymethylene, and any suitable combination thereof into the borehole, the activating agent for activating the oxidizing agent; (d) controlling a time frame during which the activating agent activates the oxidizing agent; (e) activating the oxidizing agent with the activating agent; (f) decomposing at least a portion of the filter cake by activating the oxidizing agent with the activating agent, thereby forming a residual filter cake; and (g) removing at least a portion of the residual filter cake from the borehole.

As contemplated in the method, the oxidizing agent can produce free radicals; the activating agent can be used to control the initiation of the production of free radicals, the rate of production of free radicals, or both. Once generated, free radicals can oxidize the polysaccharide polymers that encapsulate the bridging agents within the filter cake. The rate of the polymer oxidation depends on the chemical nature of the species being oxidized and other physical parameters such as temperature, pressure, pH, and free radical concentration. For example, free radicals can induce chain scission in hydrocarbons by abstracting hydrogen from a carbon present in a carbon chain, which produces a carbon radical that fragments, thereby forming an olefin and a primary radical from the remainder of the carbon chain. The free radical chain reaction may then propagate until the radicals are consumed by termination reactions.

Depending on the nature of the drilling operation, the oxidizing agent can be any suitable oxidizing agent. Non-limiting examples of suitable oxidizing agents include those selected from the group consisting of a peroxide, a percarbonate or derivative thereof, a perborate or derivative thereof, a persilicate or derivative thereof, a percarbamide or derivative thereof, a persulfate or derivative thereof, a perphosphonate or derivative thereof, and any suitable combination thereof.

Where the oxidizing agent is a peroxide, the peroxide can be selected from the group consisting of hydrogen peroxide, calcium peroxide, magnesium peroxide, alkali metal peroxides, dialkyl peroxides, and any suitable combination thereof. The oxidizing agent can also be selected from any delayed peroxide sources that release peroxide-forming species over a period of time or upon exposure to a stimulus such as exposure to a certain pH or a certain temperature. Non-limiting examples of delayed peroxide sources include solid peroxides. Other non-limiting examples of suitable oxidizing agent sources include active sources of peroxide that are encapsulated in a layer that insulates the peroxide source from the surrounding fluid or solid medium.

Other non-limiting examples of suitable oxidizing agents include percarbonates such as sodium percarbonate, perborates such as sodium perborate, persilicate salts, percarbamides (urea/peroxide adducts), persulfate compounds such as ammonium persulfate, and sodium persulfate. Other suitable oxidizing agents include chemical reagents that dissociate via homolytic cleavage to produce free radical species such as hydroxyl radicals, alkoxy radicals, and alkyl radicals. Other non-limiting examples of suitable oxidizing agents include salts and derivatives of percarbonic acid as well as salts and derivatives of perphosphonic acid.

The concentration of oxidizing agent in the first alkaline aqueous fluid may vary depending on the nature of the drilling operation. For example, the oxidizing agent can be present in the first alkaline aqueous fluid at a concentration of between about 0.1 kg/m$^3$ and about 5 kg/m$^3$. For example, the oxidizing agent can be present in the first alkaline aqueous fluid at a concentration of any one of between about 0.1 kg/m$^3$ and about 4.5 kg/m$^3$, between about 0.1 kg/m$^3$ and about 4.0 kg/m$^3$, between about 0.1 kg/m$^3$ and about 3.5 kg/m$^3$, between about 0.1 kg/m$^3$ and about 3.0 kg/m$^3$, between about 0.1 kg/m$^3$ and about 2.5 kg/m$^3$, between about 0.1 kg/m$^3$ and about 2.0 kg/m$^3$, between about 0.1 kg/m$^3$ and about 1.5 kg/m$^3$, between about 1.0 kg/m$^3$ and about 4.5 kg/m$^3$, between about 1.0 kg/m$^3$ and about 4.0 kg/m$^3$, between about 1.0 kg/m$^3$ and about 3.5 kg/m$^3$, between about 1.0 kg/m$^3$ and about 3.0 kg/m$^3$, between about 1.0 kg/m$^3$ and about 2.5 kg/m$^3$, between about 1.0 kg/m$^3$ and about 2.0 kg/m$^3$, between about 1.0 kg/m$^3$ and about 1.5 kg/m$^3$, between about 2.0 kg/m$^3$ and about 4.5 kg/m$^3$, between about 2.0 kg/m$^3$ and about 4.0 kg/m$^3$, between about 2.0 kg/m$^3$ and about 3.5 kg/m$^3$, between about 2.0 kg/m$^3$ and about 3.0 kg/m$^3$, between about 2.0 kg/m$^3$ and about 2.5 kg/m$^3$, between about 3.0 kg/m$^3$ and about 4.5 kg/m$^3$, between about 3.0 kg/m$^3$ and about 4.0 kg/m$^3$, and between about 3.0 kg/m$^3$ and about 3.5 kg/m$^3$. In some drilling operations, it is preferred that the concentration of oxidizing agent present in the first alkaline aqueous fluid be between about 0.1 kg/m$^3$ and about 1.5 kg/m$^3$.

The oxidizing agent can be surrounded by a coating at least at the time that the first alkaline aqueous fluid is introduced into the borehole of the drilling well. The coating can be any one of a water-soluble coating, a water-permeable coating, or a porous coating. In some applications, a water-soluble coating is preferable. In some applications, a water-permeable coating is preferable. In some applications, a porous coating is preferable.

As contemplated herein, activating agents not only control the initiation of radical species but also the reaction of the produced radical species with the polymers that are being oxidized. Depending on the nature of the drilling operation, the activating agent can be any suitable activating agent selected from the group consisting of an aldehyde, a dialdehyde, a polyoxymethylene, and any suitable combination thereof. Non-limiting examples of suitable aldehydes include compounds containing aldehyde functional groups such as methanal, acetaldehyde, cinnamaldehyde, and benzaldehyde. Non-limiting examples of suitable dialdehydes include those selected from the group consisting of glyoxal, malondialdehyde, and succinic dialdehyde. Non-limiting examples of suitable polyoxymethylenes include those selected from the group consisting of a paraformaldehyde or derivative thereof, a dioxane or derivative thereof, a trioxane or derivative thereof, and any suitable combination thereof. A non-limiting example of a suitable trioxane is 1, 3, 5 trioxane.

Some aldehydes, such as formaldehyde, can absorb oxygen from fluid within the wellbore and form formic acid. This in-situ generated acid can accelerate the degradation of the filter cake. In some instances, an oxygen scavenger, such as sodium thiosulfate, can also be used to remove dissolved oxygen from the fluid within the wellbore and control the reaction of the produced radical species.

The concentration of activating agent in the aqueous fluid comprising the activating agent may vary depending on the nature of the drilling operation. For example, the oxidizing agent can be present in the first alkaline aqueous fluid at a concentration of between about 0.1 kg/m$^3$ and about 20 kg/m$^3$. For example, the oxidizing agent can be present in the first alkaline aqueous fluid at a concentration of any one of between about 0.1 kg/m$^3$ and about 17.5 kg/m$^3$, between about 0.1 kg/m$^3$ and about 15.0 kg/m$^3$, between about 0.1 kg/m$^3$ and about 12.5 kg/m$^3$, between about 0.1 kg/m$^3$ and about 10.0 kg/m$^3$, between about 0.1 kg/m$^3$ and about 7.5 kg/m$^3$, between about 0.1 kg/m$^3$ and about 5.0 kg/m$^3$, between about 0.1 kg/m$^3$ and about 2.5 kg/m$^3$, between about 1.0 kg/m$^3$ and about 17.5 kg/m$^3$, between about 1.0 kg/m$^3$ and about 15.0 kg/m$^3$, between about 1.0 kg/m$^3$ and about 12.5 kg/m$^3$, between about 1.0 kg/m$^3$ and about 10.0 kg/m$^3$, between about 1.0 kg/m$^3$ and about 7.5 kg/m$^3$, between about 1.0 kg/m$^3$ and about 5.0 kg/m$^3$, between about 1.0 kg/m$^3$ and about 2.5 kg/m$^3$, between about 5.0 kg/m$^3$ and about 17.5 kg/m$^3$, between about 5.0 kg/m$^3$ and about 15.0 kg/m$^3$, between about 5.0 kg/m$^3$ and about 12.5 kg/m$^3$, between about 5.0 kg/m$^3$ and about 10.0 kg/m$^3$, between about 5.0 kg/m$^3$ and about 7.5 kg/m$^3$, between about 10.0 kg/m$^3$ and about 17.5 kg/m$^3$, between about 10.0 kg/m$^3$ and about 15.0 kg/m$^3$, and between about 10.0 kg/m$^3$ and about 12.5 kg/m$^3$.

The activating agent can be surrounded by a coating at least at the time that the first alkaline aqueous fluid is introduced into the borehole of the drilling well. The coating can be any one of a water-soluble coating, a water-permeable coating, or a porous coating. In some embodiments, a water-soluble coating is preferable. In some embodiments, a water-permeable coating is preferable. In some embodiments, a porous coating is preferable.

The oxidizing agents and activating agents may be introduced into a wellbore using conventional methods for drilling fluids, completions, and workover operations. The oxidizing agents and activating agents may also be prepared with a large variety of formulations. These specific formulations generally depend on the stage in which a fluid comprising the one or more oxidizing agents, the one or more activating agents, or both is introduced into the wellbore (e.g., depending on the depth and/or the composition of the subterranean formation). The delivery of fluids comprising the one or more oxidizing agents, the one or more activating agents, or both into the wellbore may be adjusted accordingly, taking into account the particular temperature and pressure conditions encountered in downhole. In some embodiments, other additives such as dispersants, lubricants, polyacrylamides, corrosion inhibitors, and clay stabilizers form a part of the delayed breaker method without departing from the scope of the present disclosure.

The pH of one or more fluids comprising one or more oxidizing agents, one or more activating agents, or both may be adjusted to a pH within the range of about pH 1 to about pH 10. The temperature of such fluids may be adjusted to increase or decrease the reaction rate. For example, the temperature may be maintained within the range of 20° C. to 140° C. The time lag can be programmed to allow the completion of the drilling program before destroying the filter cake.

The aqueous fluids may be derived from freshwater, seawater, brine, or mixtures thereof. In some embodiments, the aqueous fluid can be a brine. The brine can be natural or synthetic. The density of synthetic brine can be adjusted by adjusting its salt concentration. Salts that may be found in brine include, but are not limited to, sodium, calcium, aluminum, magnesium, potassium, strontium, and lithium salts of chlorides, bromides, carbonates, iodides, chlorates, bromates, formats, nitrates, oxides, sulfates, silicates, phosphates, and fluorides. Salts that may be incorporated in a brine may include organic water-soluble salts.

The thermal limit at which the delayed breaker method functions may be increased when using a non-aqueous fluid, or polar solvents. Without being bound by theory, one possible benefit of incorporating the oxidized or activator of the breaker system into a non-aqueous fluid, as opposed to an aqueous fluid, is that the additives remain relatively stable and inactive in the mixture before reaching the desired zone in which dilution with water can occur. The water required for the dilution may be associated with the hydrated polymers within the filter cake.

An Embodiment

According to an embodiment of the method, there is a delayed breaker method comprising: (i) preparing a first aqueous-based fluid comprising an oxidizing agent in solid form and a polysaccharide polymer capable of being oxidized to produce other polymers of lower molecular weight than the original polysaccharide polymer; (ii) using the first aqueous-based fluid to drill a wellbore or lateral into a subterranean formation, wherein the oxidizing agent in solid form contributes to the formation of a filter cake, becoming a persistent component of the filter cake itself; (iii) contacting the filter cake with a second aqueous fluid comprising an activating agent capable of activating the oxidizing agent; and (iv) allowing the second aqueous fluid to remain in contact with the filter cake at the downhole temperature and pressure for a period of time sufficient to degrade the polysaccharide polymer to produce the other polymers of lower molecular weight and disrupt the structural integrity of the filter cake. In some embodiments, a residual filter cake remains after the structural integrity of the filter cake has been disrupted, in which case an additional step of flushing the wellbore or lateral with a third aqueous-based fluid to remove the broken polysaccharide polymer and the residual filter cake can be taken.

It is contemplated that the oxidizing agent can produce free radicals upon reaction with the activating agent. It is believed that free radicals at least in part rupture the integrity of the filter cake.

Another Embodiment

In some drilling operations, it is desirable to avoid the need for separate well clean-up treatments to remove the residues of a filter cake. In some drilling operations, it is desirable to adopt a delayed breaker method with good zonal coverage. Such advantages may be achieved by incorporating both the oxidizing agent and the activating agent into the drilling fluid formulation. Furthermore, in some instances, the oxidizing agent and the activating agent may be combined in situ when the oxidation activity needs to be concentrated at a particular region of the wellbore or when there is a concern that one of the two components will be prematurely consumed before reaching the region.

According to another embodiment of the method, there is a delayed breaker method comprising the following steps: (i) preparing a first aqueous-based fluid comprising an oxidizing agent and an activating agent capable activating the oxidizing agent; (ii) using the first aqueous-based fluid to drill a wellbore or lateral into a subterranean formation; (iii) forming a filter cake comprising oxidizing agent and the activating agent; and (iv) reacting the oxidizing agent and the activating agent within the filter cake. In some embodiments, a residual filter cake remains after the structural integrity of the filter cake has been disrupted, in which case an additional step of flushing the wellbore or lateral with a second aqueous-based fluid to remove the broken polysaccharide polymer and the residual filter cake can be taken.

It is contemplated that the oxidizing agent can produce free radicals upon reaction with the activating agent. It is believed that free radicals at least in part rupture the integrity of the filter cake.

As contemplated in this embodiment, the first aqueous-based fluid is a drilling fluid. In other embodiments, the first aqueous-based fluid can be a stimulation fluid, fracturing fluid, spotting fluid, packer fluid, or a combination thereof.

Another Embodiment

The length of the controlled free radical initiation phase may be controlled by generating an acidic compound in situ. According to another embodiment of the method, there is a delayed breaker method comprising the following steps: (A) preparing a first aqueous fluid comprising (i) a compound containing an aldehyde functional group and (ii) an acid-generating compound capable of reacting with the aldehyde group to produce an acid or tertiary amine salt in situ; (B) preparing a second aqueous fluid comprising an oxidizing agent; (C) mixing the first aqueous fluid and the second aqueous fluid, thereby producing a third aqueous fluid; (D) contacting the third aqueous fluid with a filter cake for a sufficient period of time for rupturing the filter cake; and (E) removing the ruptured filter cake. Without being bound by theory, it is believed that the presence of an acid-generating compound in situ accelerates the reaction and shortens the length of the initiation phase of the free radicals in the third aqueous fluid.

Non-limiting examples of suitable acid-generating compounds include ammonium chloride, ammonium nitrate, ammonium sulfate, ammonium hydroxide, ammonium bromide diammonium phosphate, an ammonium salt of organic acids, ammonium acetate, ammonium format, and any combination thereof.

It is contemplated that the oxidizing agent can produce free radicals upon reaction with the activating agent. It is believed that free radicals at least in part rupture the integrity of the filter cake. As contemplated herein, a "sufficient period of time" refers to a time period needed to compromise the integrity of the filter cake so as to permit removal of the filter cake from the wellbore or lateral. Suitable "sufficient" periods of time include any period between about one day and about seven days.

The concentration of the acid-generating compound can range from 0.1 wt. % to 10 wt. %. As contemplated in this embodiment, the concentration of the acid-generating company is between 0.1 wt. % and 2% wt. % of the activating agent concentration. Care should be taken to ensure that the pH of the base fluid does not fall below pH 7, where the initiation of the free radicals can be rapid despite the low temperature. The acid-generating compound may be injected into the formation either ahead of or behind the first alkaline aqueous fluid.

The time delay in breaking down a filter cake can be achieved by controlling the concentration of the in situ generated tertiary amine salt. For example, ammonium salt is added into the first aqueous fluid, and the rate of oxidation of the polysaccharide polymers depends, at least in part, on the generation of the tertiary amine salt in situ. In addition, the pH of the wellbore fluid is typically about 9 to about 10, and this high pH would usually buffer the in situ generated acid and slow down the reaction between the activating agent and the oxidizing agent. The concentration of the in situ generated tertiary amine salt can be between 0.1 wt. % and 5 wt. % of the first aqueous fluid. Preferably, the concentration of the in situ generated tertiary amine salt is between 0.1 wt. % and 1 wt. % of the first aqueous fluid.

In an example, the products of the reaction between formaldehyde and ammonium chloride include hexamethylenetetramine and hydrochloric acid, as shown in the following reaction: $6HCHO+4NH_4Cl \rightarrow C_6H_{12}N_4+4HCl$. Hexamethylenetetramine is soluble in water and its pH in solution can be controlled to be between about 7.5 and about 9. Therefore, the released acid may initiate production of the free radicals, while hexamethylenetetramine can act to lower the reaction rate. Similarly, dialdehydes such as glyoxal can react with the ammonium salt to produce formic acid, imidazole, and imidazole derivatives. Imidazole is soluble in water and can serve as a corrosion inhibitor for carbon steel. In other embodiments, no corrosion inhibitor is required.

In another example, a tertiary amine salt may be formed in situ by incorporating non-acidic, non-corrosive chemicals that react to form the necessary tertiary amine salt in situ. For example, the base fluid may contain an ammonium salt and polyoxymethylene. A portion of the polyoxymethylene may then react with the ammonium salt to generate the tertiary amine salt necessary to initiate the production of the free radicals, as shown in the following reaction: 9 Paraformaldehyde+$2n\ NH_4Cl \rightarrow 2n\ (CH_3)_3N \cdot HCl+3n\ H_2O+3n\ CO_2$. The tertiary amine salt may dissociate in water to produce a tertiary amine moiety and an acid moiety. Upon dissociation, the released acid moiety may initiate the free radical production, while the tertiary amine lowers the reaction rate. In some embodiments, a corrosion inhibitor is used. In other embodiments, no corrosion inhibitor is used because the produced tertiary amine can serve as a corrosion inhibitor for the carbon steel.

In yet another example, the delayed breaker method comprises: (A) preparing a first aqueous fluid comprising (i) polyoxymethlene and (ii) an acid-generating compound capable of reacting with the polyoxymethlene to produce a tertiary amine salt in situ; (B) preparing a second aqueous fluid comprising an oxidizing agent; (C) mixing the first aqueous fluid and the second aqueous fluid, thereby producing a third aqueous fluid; (D) contacting the third aqueous fluid with a filter cake for a sufficient period of time for rupturing the filter cake; and (E) removing the ruptured filter cake.

Example 1

A sample of unweighted water-based drilling fluid (WBM) was prepared. The formulation of the unweighted WBM is shown in Table 1.

TABLE 1

| Component | Loading, kg/m$^3$ |
|---|---|
| Water | 1000 |
| Polyanionic cellulose R | 4.3 |
| Modified starch (Drilstar EW) | 17.1 |

The pH of the unweighted WBM was adjusted to about 9.3 by adding a few drops of 1N sodium hydroxide solution. High loadings of polyanionic cellulose R and modified starch were deliberately used to be able to monitor the change in the rheology of the fluid. Magnesium peroxide powder at a loading of 1.5 kg/m$^3$ was added into the unweighted WBM, and the mixture was placed in a convection oven at 65° C. and left undisturbed. The mixture was removed from the oven periodically to measure its rheology and pH at room temperature before being returned. The results are shown in FIG. 1. No significant change in the plastic viscosity (PV) or yield point (YP) of the mixture was observed over about 7 days, while the pH of the mixture dropped from 9.3 to 8.2.

Example 2

A sample of water-based drilling fluid (WBM) was prepared. The formulation of the WBM is shown in Table 2.

TABLE 2

| Component | Loading, kg/m$^3$ |
|---|---|
| Water | 1000 |
| Polyanionic cellulose R | 4.3 |
| Modified starch (Drilstar EW) | 17.1 |
| paraformaldehyde | 2.9 |

Figure 2:
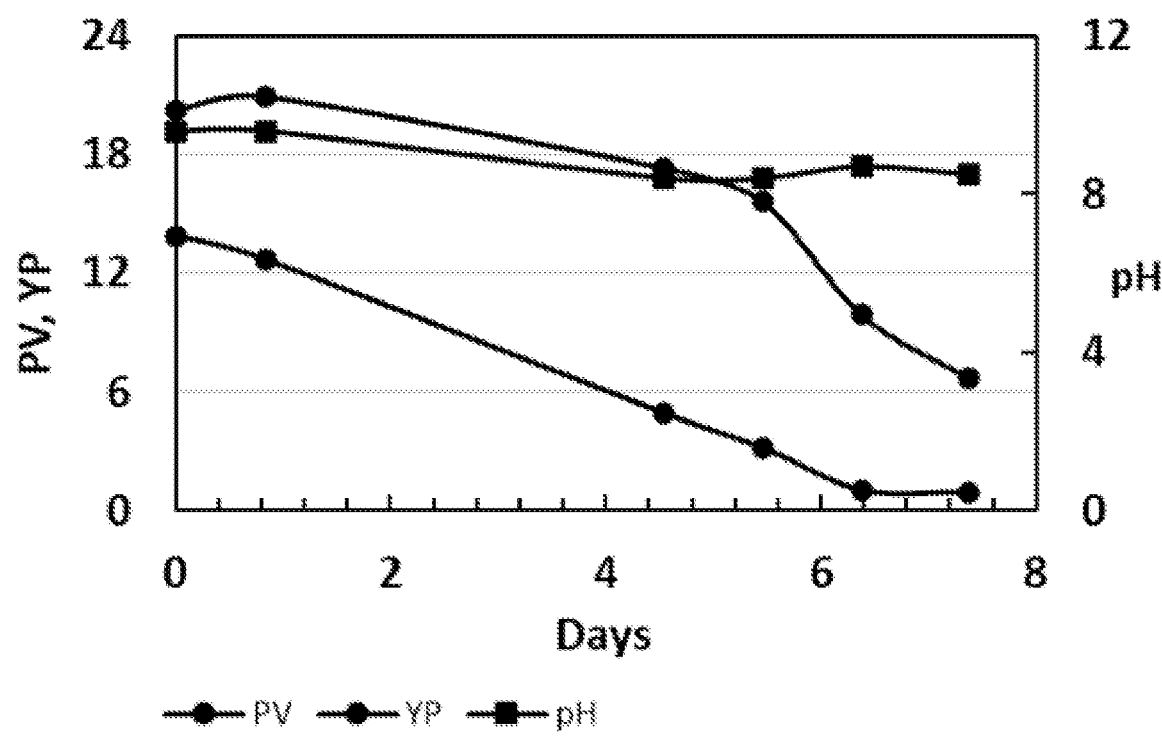
FIG. 2 is a graph that illustrates the change in the plastic viscosity (PV, as measured in mPa·s), yield point (YP, as measured in Pa) and pH according to an embodiment of a water-based drilling fluid described in Example 2 herein.
Figure 3:
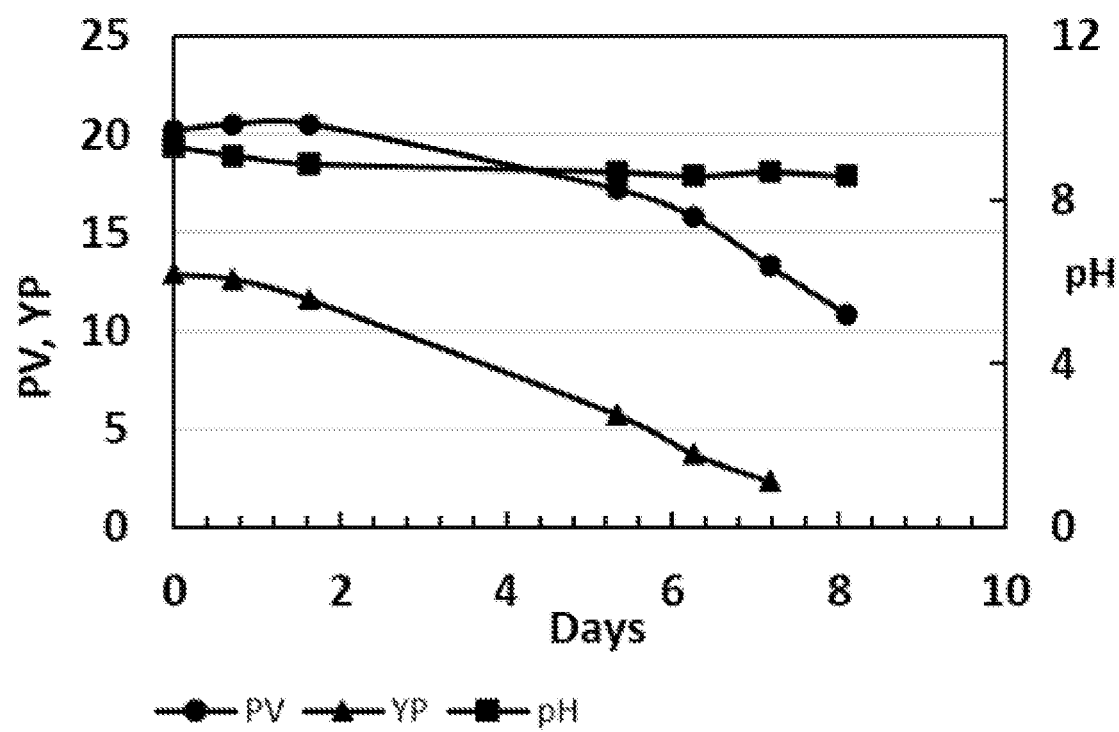
FIG. 3 is a graph that illustrates the change in the plastic viscosity (PV, as measured in mPa·s), yield point (YP, as measured in Pa) and pH according to an embodiment of a water-based drilling fluid described in Example 3 herein.

As shown in FIG. 2, the plastic viscosity slowly decreased from 20.9 to 15.6 over a period of 5.5 days. A sudden decrease in the plastic viscosity was observed after 5.5 days. This sharp decrease revealed the degradation of the polysaccharide polymer. The yield point declined gradually to 0.9, whereas the pH remained above 8 throughout the test.

Example 3

A sample of water-based drilling fluid (WBM) was prepared. The formulation of the WBM is shown in Table 3.

TABLE 3

| Component | Loading, kg/m$^3$ |
|---|---|
| Water | 1000 |
| Polyanionic cellulose R | 4.3 |
| Modified starch (Drilstar EW) | 17.1 |
| cinnamaldehyde | 2.9 |

The plastic viscosity declined slowly from 20.2 to 15.8 within about 6 days. Although the pH remained above 8.6, the plastic viscosity decreased from 20.2 to 10.9 over about 8 days, indicating that the degradation of the polysaccharide polymer was independent of the pH.

General

It is contemplated that any part of any aspect or embodiment discussed in this specification can be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. A method for removing a filter cake from a borehole in a subterranean formation, the method comprising:
    (a) introducing a first alkaline aqueous fluid comprising an oxidizing agent into the borehole during a drilling operation;
    (b) forming the filter cake;
    (c) introducing an activating agent selected from the group consisting of an aldehyde, a dialdehyde, a polyoxymethylene, and any combination thereof into the borehole;
    (d) controlling a time frame during which the activating agent activates the oxidizing agent;
    (e) activating the oxidizing agent with the activating agent; and
    (f) degrading at least a portion of the filter cake by activating the oxidizing agent with the activating agent; wherein the activating agent is surrounded by a coating at least at the time that the activating agent is introduced into the borehole.

2. The method as claimed in claim 1, wherein the oxidizing agent is selected from the group consisting of a peroxide, a percarbonate or derivative thereof, a perborate or derivative thereof, a persilicate or derivative thereof, a percarbamide or derivative thereof, a persulfate or derivative thereof, a perphosphonate or derivative thereof, and any combination thereof.

3. The method as claimed in claim 2, wherein the peroxide is selected from the group consisting of hydrogen peroxide, calcium peroxide, magnesium peroxide, alkali metal peroxides, dialkyl peroxides, and any combination thereof.

4. The method as claimed in claim 1, wherein the oxidizing agent is present in the first alkaline aqueous fluid at a concentration of between about 0.1 kg/m$^3$ and about 5 kg/m$^3$.

5. The method as claimed in claim 4, wherein the concentration of the oxidizing agent in the first alkaline aqueous fluid is between about 0.1 kg/m$^3$ and about 1.5 kg/m$^3$.

6. The method as claimed in claim 1, wherein the oxidizing agent is surrounded by a coating at least at the time that the first alkaline aqueous fluid is introduced into the borehole.

7. The method as claimed in claim 6, wherein the coating is selected from the group consisting of a water-soluble coating, a water-permeable coating, and a porous coating.

8. The method as claimed in claim 1, wherein the polyoxymethylene is selected from the group consisting of a paraformaldehyde or derivative thereof, a dioxane or derivative thereof, a trioxane or derivative thereof, and any combination thereof.

9. The method as claimed in claim 8, wherein the trioxane is a 1,3,5 trioxane.

10. The method as claimed in claim 1, wherein the coating is selected from the group consisting of a water-soluble coating, a water-permeable coating, and a porous coating.

11. The method as claimed in claim 1, wherein the subterranean formation has a temperature range that does not exceed 120° C.

12. The method as claimed in claim 1, wherein the subterranean formation has a pressure that is equal to or greater than atmospheric pressure.

13. The method as claimed in claim 1, wherein the filter cake is formed in a manner such that the filter cake comprises the oxidizing agent.

14. The method as claimed in claim 1, wherein the first alkaline aqueous fluid further comprises a polymer capable of being oxidized by the oxidizing agent.

15. The method as claim in claim 1, wherein the activating agent is a part of a second aqueous fluid, and wherein the activating agent is introduced into the borehole by introducing the second aqueous fluid into the borehole.

16. The method as claimed in claim 15, wherein the activating agent is present in the second aqueous fluid at a concentration of between about 0.1 kg/m$^3$ and about 20 kg/m$^3$.

17. The method as claimed in claim 15, wherein the second aqueous fluid is introduced into the borehole after the filter cake is formed.

18. The method as claimed in claim 17, further comprising placing the second aqueous fluid in fluid communication with the filter cake.

19. The method as claimed in claim 1, wherein the first alkaline aqueous fluid further comprises the activating agent.

20. The method as claimed in claim 19, wherein the activating agent is present in the first alkaline aqueous fluid at a concentration of between about 0.1 kg/m$^3$ and about 20 kg/m$^3$.

21. The method as claimed in claim 19, wherein the filter cake is formed in a manner such that the filter cake comprises the oxidizing agent and the activating agent.

22. The method as claimed in claim 19, wherein the first alkaline aqueous fluid is selected from the group consisting of a drilling fluid, a stimulation fluid, a fracturing fluid, a spotting fluid, a packer fluid, and any combination thereof.

23. The method as claimed in claim 1, further comprising: (a) preparing a first preparatory fluid comprising the activating agent; (b) preparing a second preparatory fluid comprising the oxidizing agent; (c) mixing the first preparatory fluid and the second preparatory fluid to form the first alkaline aqueous fluid; and (d) introducing an acid-generating compound into the borehole.

24. The method as claimed in claim 23, wherein the acid-generating compound is introduced into the borehole after the first alkaline aqueous fluid is introduced into the borehole.

25. The method as claimed in claim 23, wherein the acid-generating compound is introduced into the borehole before the first alkaline aqueous fluid is introduced into the borehole.

26. The method as claimed in claim 23, wherein the first alkaline aqueous fluid has a pH that is between about 9 and about 10.

27. The method as claimed in claim 24, wherein the activating agent is present in the first alkaline aqueous fluid at a concentration of between about 0.1 kg/m$^3$ and about 20 kg/m$^3$.

28. The method as claimed in claim 27, wherein the acid-generating compound is present in the first alkaline aqueous fluid at a concentration of between about 0.1 wt. % and about 10 wt. % of the activating agent.

29. The method as claimed in claim 27, wherein the acid-generating compound is present in the first alkaline aqueous fluid at a concentration of between about 0.1 wt. % and about 2 wt. % of the activating agent.

30. The method as claimed in claim 23, wherein the acid-generating compound is adapted to react with the activating agent to form at least one of an acid and a tertiary amine salt.

31. The method as claimed in claim 23, wherein the acid-generating compound is adapted to react with the activating agent to form a tertiary amine salt at a concentration of between about 0.01 wt. % and about 5 wt. % of the first alkaline aqueous fluid.

32. The method as claimed in claim 31, wherein the concentration is between about 0.1 wt. % and about 1 wt. % of the first alkaline aqueous fluid.

33. The method as claimed in claim 23, wherein the acid-generating compound is selected from the group consisting of an ammonium salt, a di-ammonium salt, and a combination thereof.

34. The method as claimed in claim 33, wherein the ammonium salt is selected from the group consisting of ammonium chloride, ammonium nitrate, ammonium sulfate, ammonium hydroxide, ammonium bromide, an ammonium salt of an organic acid, and any suitable combination thereof.

35. The method as claimed in claim 34, wherein the ammonium salt of an organic acid is selected from the group consisting of ammonium acetate and ammonium formate.

36. The method as claimed in claim 33, wherein the di-ammonium salt is di-ammonium phosphate.

37. The method as claimed in claim 23, wherein the activating agent is formaldehyde and the acid-generating compound is ammonium chloride.

38. The method as claimed in claim 23, wherein the activating agent is polyoxymethylene and the acid-generating compound is an ammonium salt.

39. The method as claimed in claim 23, wherein the oxidizing agent is a source of free radicals.

40. The method as claimed in claim 23, further comprising placing the first alkaline aqueous fluid in fluid communication with the filter cake.

* * * * *